(12) United States Patent
Tanaka

(10) Patent No.: US 11,163,294 B2
(45) Date of Patent: Nov. 2, 2021

(54) MANAGEMENT APPARATUS AND NON-TRANSITORY COMPUTER READABLE MEDIUM

(71) Applicant: FUJIFILM BUSINESS INNOVATION CORP., Tokyo (JP)

(72) Inventor: Hironori Tanaka, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 416 days.

(21) Appl. No.: 15/993,823

(22) Filed: May 31, 2018

(65) Prior Publication Data
US 2018/0364680 A1 Dec. 20, 2018

(30) Foreign Application Priority Data

Jun. 14, 2017 (JP) .............................. JP2017-117053

(51) Int. Cl.
*G05B 19/4099* (2006.01)
*B33Y 50/02* (2015.01)

(52) U.S. Cl.
CPC .......... *G05B 19/4099* (2013.01); *B33Y 50/02* (2014.12); *G05B 2219/35134* (2013.01); *G05B 2219/49007* (2013.01)

(58) Field of Classification Search
CPC ...... G05B 19/4099; G05B 2219/35134; G05B 2219/49007; B33Y 50/02; G06F 3/1267;
(Continued)

(56) References Cited

U.S. PATENT DOCUMENTS 7,656,547 B2    2/2010  Kuo et al.
2001/0015812 A1* 8/2001  Sugaya ................. G06F 3/1288
                                                            358/1.1
(Continued)

FOREIGN PATENT DOCUMENTS

JP       H09-274548 A    10/1997
JP       2005-108243 A    4/2005
(Continued)

OTHER PUBLICATIONS

Mar. 2, 2021 Office Action issued in Japanese Patent Application No. 2017-117053.

*Primary Examiner* — Thomas C Lee
*Assistant Examiner* — Ameir Myers
(74) *Attorney, Agent, or Firm* — Oliff PLC

(57) ABSTRACT

A management apparatus includes a data acquiring unit, a desired-time acquiring unit, an assigning unit, and a data output unit. The data acquiring unit acquires image data expressing at least one of a three-dimensional image and an image. The desired-time acquiring unit acquires desired time information associated with the image data. The desired time information indicates a desired time for completing an image forming process for forming the image. The desired time is expressed as at least one of a time point and a time frame. The assigning unit assigns image formation of the image data to an image forming apparatus that performs the image forming process such that the image forming process is completed at the desired time indicated by the desired time information. The data output unit outputs the image data toward the image forming apparatus assigned by the assigning unit.

7 Claims, 6 Drawing Sheets

(58) Field of Classification Search
CPC .... G06F 3/1259; G06F 3/1207; G06F 3/1217; G06F 3/1229; G06F 3/1282; G06F 3/1263; G06F 3/1212
See application file for complete search history.

(56) References Cited

U.S. PATENT DOCUMENTS

| | | | |
|---|---|---|---|
| 2002/0126307 A1* | 9/2002 | Ohwa | H04N 1/32502 358/1.14 |
| 2006/0044594 A1* | 3/2006 | Shirai | G06F 3/1259 358/1.14 |
| 2006/0200389 A1* | 9/2006 | Kitagawa | H04N 1/00145 705/26.1 |
| 2007/0071462 A1* | 3/2007 | Koitabashi | G06F 3/1231 399/23 |
| 2007/0146772 A1* | 6/2007 | Castellani | G06K 15/1859 358/1.15 |
| 2011/0208556 A1* | 8/2011 | Nagahara | G06Q 10/063112 705/7.14 |
| 2015/0205544 A1* | 7/2015 | Webb | H04N 1/4433 358/1.15 |
| 2017/0274587 A1* | 9/2017 | Hakkaku | B29C 64/112 |
| 2018/0099460 A1* | 4/2018 | Iverson | B29C 64/20 |
| 2018/0293034 A1* | 10/2018 | Uchida | G06F 3/1255 |

FOREIGN PATENT DOCUMENTS

| | | | | |
|---|---|---|---|---|
| JP | 2006-244370 A | | 9/2006 | |
| JP | 2006244370 A | * | 9/2006 | ......... H04N 1/00188 |
| JP | 2013-067018 A | | 4/2013 | |
| JP | 2013067018 A | * | 4/2013 | |

* cited by examiner

| ID | DESIRED COMPLETION TIME POINT | PRINTER AS TRANSMISSION DESTINATION | EXPECTED TRANSMISSION TIME POINT | PRINTING EXECUTION TIME |
|---|---|---|---|---|
| 1 | 3/1 21:00 | PRT1 | 3/1 18:00 | 3:00 |
| 2 | 3/1 21:30 | PRT2 | 3/1 19:30 | 2:00 |
| 3 | 3/1 22:00 | PRT3 | 3/1 20:00 | 2:00 |
| 3 | NONE | PRT2 | 3/1 18:10 | 1:00 |

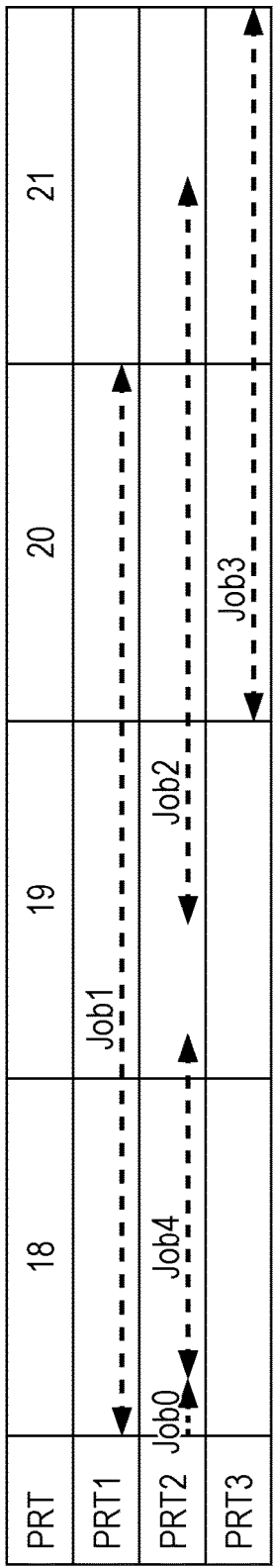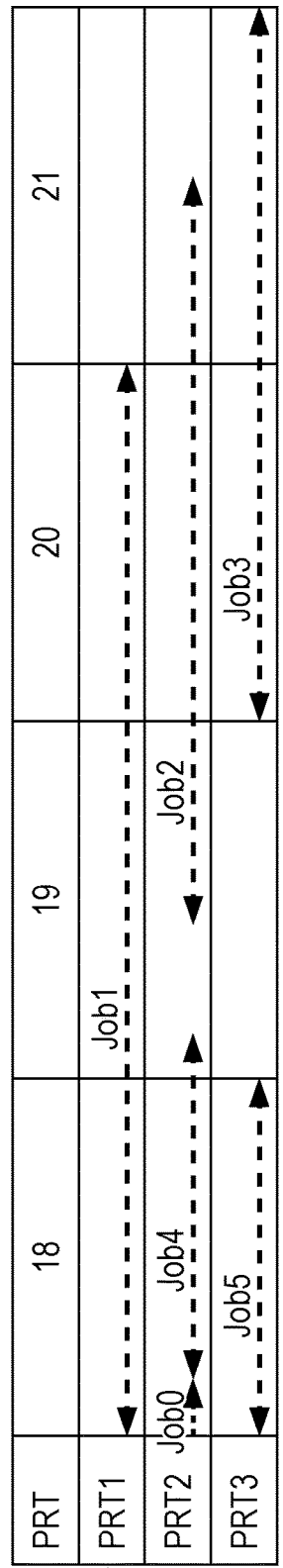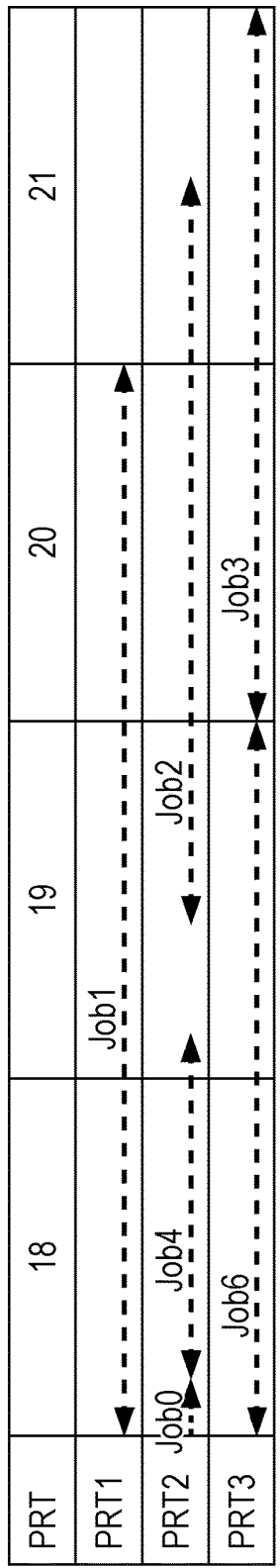

FIG. 7

| PRT | 18 | 19 | 20 | 21 |
|---|---|---|---|---|
| PRT1 | ←----------- Job7 -----------→ | | | |
| PRT2 | ←-- Job11 --→ | ←-- Job10 --→ | ←-- Job8 --→ | |
| PRT3 | | | ←------------ Job9 ------------→ | |

FIG. 8

| PRT | 18 | 19 | 20 | 21 |
|---|---|---|---|---|
| PRT1 | ←----------- Job7 -----------→ | | | |
| PRT2 | ←-- Job11 --→ | ←-- Job12 --→ | ←-- Job8 --→ | |
| PRT3 | ←-- Job10 --→ | | ←------------ Job9 ------------→ | |

FIG. 9

| PRT | 18 | 19 | 20 | 21 |
|---|---|---|---|---|
| PRT1 | ←----------- Job13 -----------→ | | | |
| PRT2 | ←-- Job16 --→ | ←-- Job14 --→ | ←-- Job15 --→ | |
| PRT3 | Job17 | | | |

MANAGEMENT APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-117053 filed Jun. 14, 2017.

BACKGROUND

Technical Field

The present invention relates to management apparatuses and non-transitory computer readable media.

SUMMARY

According to an aspect of the invention, there is provided a management apparatus including a data acquiring unit, a desired-time acquiring unit, an assigning unit, and a data output unit. The data acquiring unit acquires image data expressing at least one of a three-dimensional image and an image. The desired-time acquiring unit acquires desired time information associated with the image data. The desired time information indicates a desired time for completing an image forming process for forming the image. The desired time is expressed as at least one of a time point and a time frame. The assigning unit assigns image formation of the image data to an image forming apparatus that performs the image forming process such that the image forming process is completed at the desired time indicated by the desired time information. The data output unit outputs the image data toward the image forming apparatus assigned by the assigning unit.

BRIEF DESCRIPTION OF THE DRAWINGS

Exemplary embodiments of the present invention will be described in detail based on the following figures, wherein:

FIG. 4 is a graph of the schedule shown in FIG. 3;

FIG. 5 illustrates an example of a schedule in a case where a new job is added to the schedule shown in FIG. 4;

FIG. 6 illustrates another example of a schedule in a case where a new job is added to the schedule shown in FIG. 4;

FIG. 7 is a graph of a schedule different from the schedule shown in FIG. 3;

FIG. 8 illustrates an example of a schedule in a case where a new job is added to the schedule shown in FIG. 7;

FIG. 9 is a graph of another schedule different from the schedules shown in FIGS. 3 and 7.

DETAILED DESCRIPTION

Exemplary embodiments of the present invention will be described below with reference to the drawings.

Figure 1:
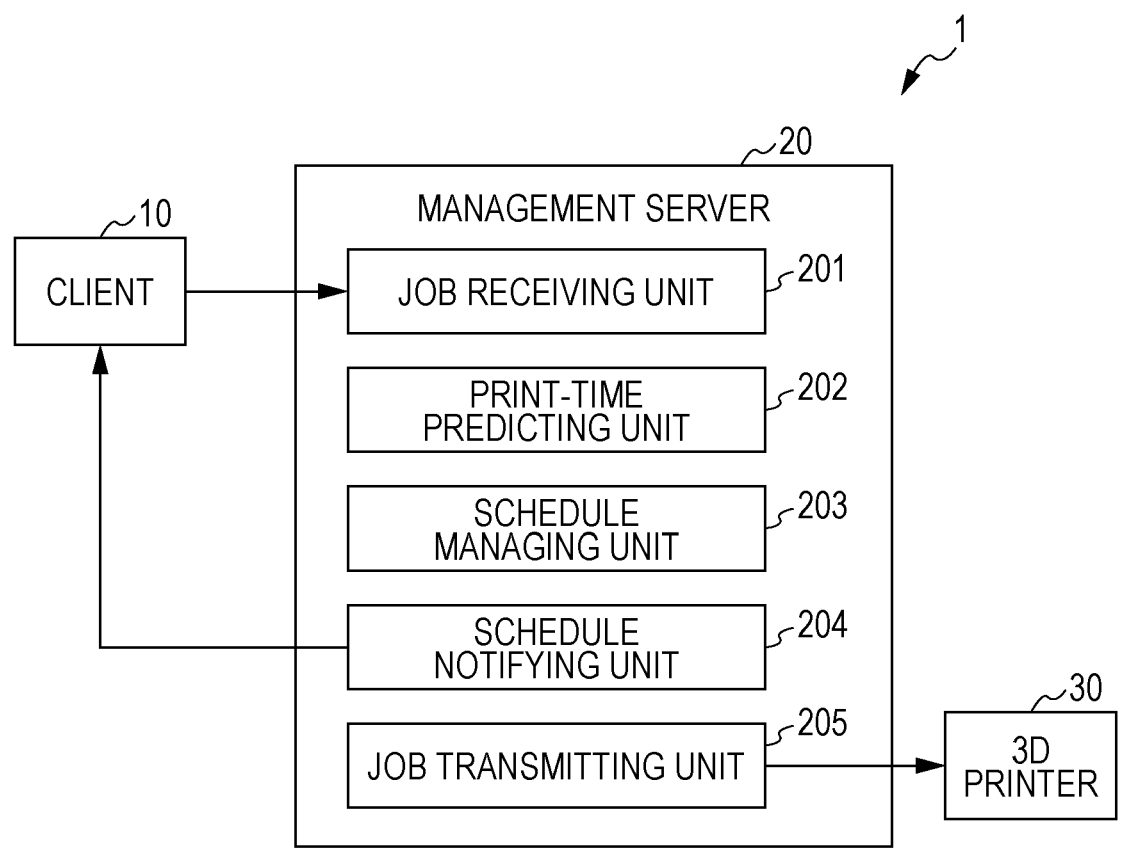
FIG. 1 illustrates a printing system that includes a management server corresponding to a management apparatus according to an exemplary embodiment of the present invention.

FIG. 1 illustrates a printing system that includes a management server corresponding to a management apparatus according to an exemplary embodiment of the present invention.

In this example, a three-dimensional (3D) printer is illustrated as an apparatus to be managed by the management server. Alternatively, the management apparatus according to the exemplary embodiment of the present invention may manage a two-dimensional (2D) printer or may manage both a 3D printer and a 2D printer.

A printing system 1 according to this exemplary embodiment includes a client terminal 10, a management server 20, and a 3D printer 30 as system components. These system components are connected to one another by, for example, a local area network (LAN).

The client terminal 10 is to be operated by a user using the printing system 1 and is, for example, a personal computer as hardware. The user may operate the client terminal 10 so as to create print data expressing a desired three-dimensional image to be output from the 3D printer 30 or to load already-created print data. Then, the user may cause the client terminal 10 to transmit the print data to the management server 20, thus causing the 3D printer 30 to execute a process for forming the three-dimensional image. An output material obtained as a result of the image forming process is collected from the 3D printer 30 by the user. In this exemplary embodiment, the print data transmitted from the client terminal 10 to the management server 20 may sometimes contain designation information about a desired time point designated for completing printing. This desired time point may sometimes be designated as a time frame. As will be described later, the process for forming the three-dimensional image expressed by the print data is completed such that the time point (or time frame) designated in the designation information is satisfied.

The 3D printer 30 sequentially forms the three-dimensional image in a layer-by-layer fashion based on the print data expressing the three-dimensional image. Examples of the 3D printer 30 that may be used include a stereolithography type, a selective laser sintering type, a fused deposition modeling type, a binder jet type, and a material jet type. Although a single block is illustrated as the 3D printer 30 in FIG. 1, it is assumed that the printing system 1 includes three 3D printers 30 as an example. Alternatively, the management apparatus according to the exemplary embodiment of the present invention may manage a single printer.

The management server 20 corresponds to the management apparatus according to the exemplary embodiment of the present invention and manages each 3D printer 30. The management server 20 according to this exemplary embodiment is a general-purpose server computer including a central processing unit (CPU) and a hard disk device as hardware devices, and also including semiconductor storage devices, such as a random access memory (RAM) and a read-only memory (ROM). The management apparatus according to the exemplary embodiment of the present invention has a function of loading a management program according to an exemplary embodiment of the present invention into the server computer and causing the server computer to execute the management program. The management server 20 manages various matters in the printing system 1. In this exemplary embodiment, the management server 20 manages, for example, user authorization and authentication, output of print data to the 3D printer 30, and a billing process with respect to the user for the use of the printing system 1.

Although the management server 20 executes various kinds of management processes mentioned above, the functional configuration shown in FIG. 1 is related to one of these kinds of management processes for managing the output of the print data, including scheduling thereof, to the 3D printer 30. Specifically, the management server 20 includes a job receiving unit 201, a print-time predicting unit 202, a schedule managing unit 203, a schedule notifying unit 204, and a job transmitting unit 205. The functional configuration of such a management server 20 expresses the functional configuration of the management apparatus according to the exemplary embodiment of the present invention and also expresses a program configuration of the management program according to the exemplary embodiment of the present invention.

The job receiving unit 201 receives the print data as a job from the client terminal 10. The job receiving unit 201 also receives the designation information contained in the print data. This job receiving unit 201 corresponds to an example of both a data acquiring unit and a desired-time acquiring unit according to an exemplary embodiment of the present invention. The desired-time acquiring unit according to the exemplary embodiment of the present invention may alternatively be configured to acquire the desired time (i.e., at least one of a desired time point and a desired time frame) independently of the print data.

Based on the print data, the print-time predicting unit 202 predicts the necessary time it takes for the 3D printer 30 to output the three-dimensional image expressed by the print data. A specific prediction method will not be described in detail since any known method may be employed.

Based on the time point (or the time frame) designated in the designation information contained in the print data and the necessary time predicted by the print-time predicting unit 202, the schedule managing unit 203 assigns output schedules to the three 3D printers 30 such that the designated time point (or the time frame) is satisfied. The assigning of the schedules will be described in detail later. The schedule managing unit 203 corresponds to an example of an assigning unit according to an exemplary embodiment of the present invention. Since a 3D printer 30 uses a longer period of output time than a 2D printer, the user requesting the output may not always be in a situation where the user is able to collect the output material upon completion of the output. By assigning a schedule that satisfies the desired time, the output is completed at the time point or time frame at which the user may collect the output material, thereby achieving an improved operating rate of the 3D printers.

In a case where a schedule is assigned by the schedule managing unit 203, the schedule notifying unit 204 notifies the user, who has transmitted the print data to be output, of the assigned schedule by using, for example, electronic mail via the client terminal 10. The schedule notifying unit 204 corresponds to an example of an assignment notifying unit according to an exemplary embodiment of the present invention.

The job transmitting unit 205 transmits the print data as a job to a 3D printer 30 in accordance with the schedule assigned by the schedule managing unit 203. The job transmitting unit 205 corresponds to an example of a data output unit according to an exemplary embodiment of the present invention.

Next, the schedule assigning process performed by the schedule managing unit 203 will be described in detail.

Figure 2:
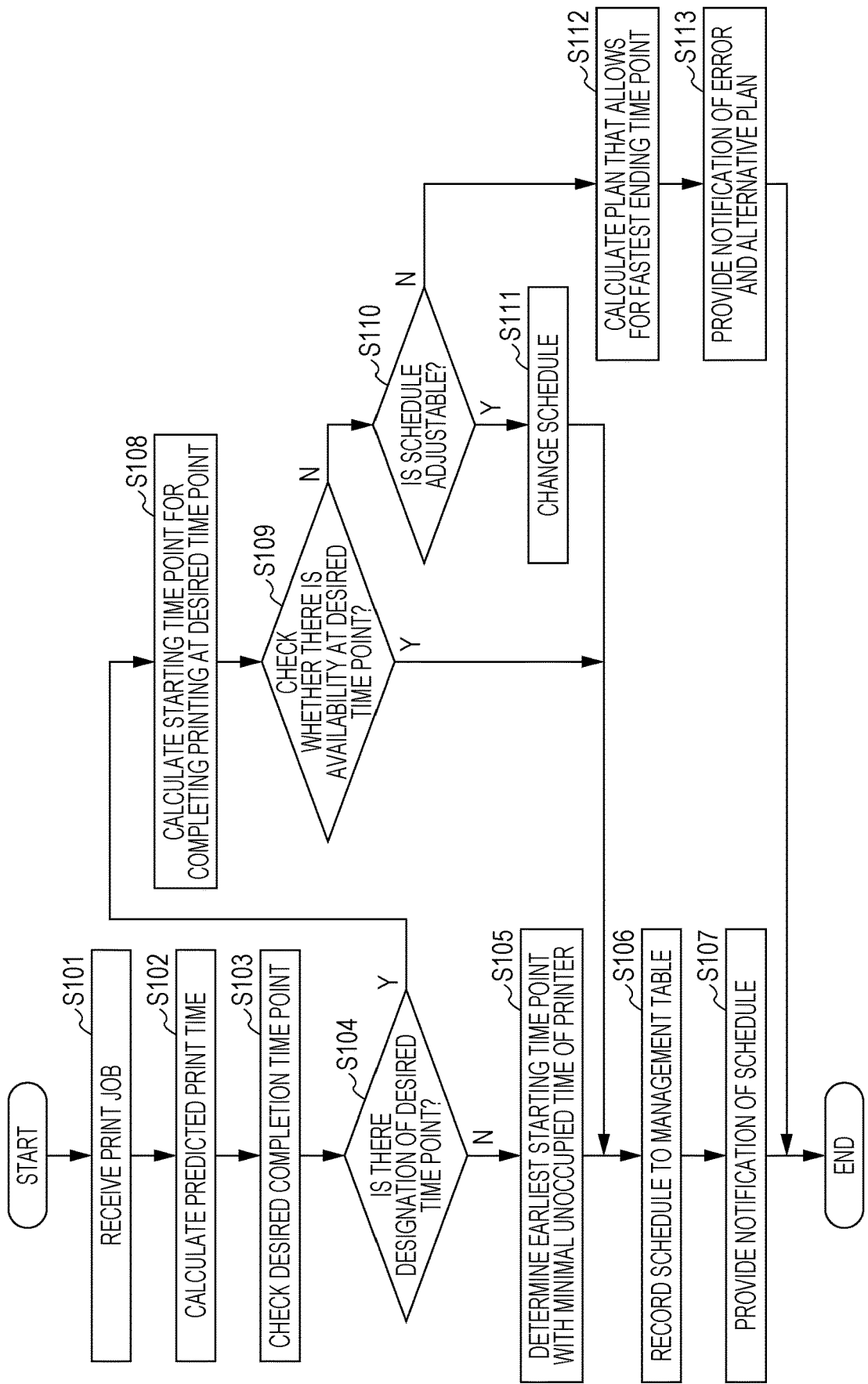
FIG. 2 is a flowchart illustrating the operation of the management server centered on the operation of a schedule managing unit.

FIG. 2 is a flowchart illustrating the operation of the management server 20 centered on the operation of the schedule managing unit 203.

The operation indicated in the flowchart shown in FIG. 2 is executed every time print data (job) is transmitted from the client terminal 10 shown in FIG. 1.

First, in step S101, the job receiving unit 201 receives print data (job). Then, in step S102, the print-time predicting unit 202 predicts the necessary time it takes for printing based on the print data.

In step S103, the schedule managing unit 203 checks whether or not the print data contains designation information. If designation information is not contained in the print data (i.e., there is no designation of a desired time point) (NO in step S104), the operation proceeds to step S105 where the schedule managing unit 203 assigns a schedule with the earliest starting time point from among schedules with the minimal unoccupied time of the printers.

Then, the schedule managing unit 203 records the assigned schedule to a management table in step S106, and the schedule notifying unit 204 notifies the user of the assigned schedule by using electronic mail in step S107.

Since there are three 3D printers as an example in this exemplary embodiment, the notification provided to the user includes an expected completion time point and an output destination. The notification provided by the notifying unit according to the exemplary embodiment of the present invention may include information indicating that a schedule is ascertained and an output material is collectable upon completion of printing. For example, if the output destination is a single location or if multiple output destinations exist but are close to each other, the notification may include the predicted completion time point alone without the information about the output destination. Furthermore, the notification provided by the notifying unit according to this exemplary embodiment of the present invention may be provided by a method other than the method using electronic mail.

After the notification in step S107, the operation indicated in the flowchart shown in FIG. 2 ends. When the starting time point of the assigned schedule is reached, the job transmitting unit 205 outputs the print data corresponding to the schedule toward the 3D printers 30.

If the print data contains designation information (i.e., there is designation of a desired time point) in step S104 described above (YES in step S104), the schedule managing unit 203 calculates a starting time point for completing printing at the desired time point indicated in the designation information (i.e., a time point calculated by subtracting the necessary time calculated in step S102 from the desired time point) in step S108. Then, in step S109, the schedule managing unit 203 checks, on the aforementioned management table, whether or not there is availability in the schedule that satisfies such starting time point and ending time point. If there is availability as a result of this checking process, the schedule managing unit 203 records the schedule, which satisfies the desired time point, onto the management table in step S106, and the schedule notifying unit 204 notifies the user of the assigned schedule by using electronic mail in step S107.

If there is no availability in the schedule in step S109 described above, the schedule managing unit 203 checks in step S110 whether or not the schedule is adjustable, that is, whether or not it is possible to create availability in the schedule that satisfies the starting time point and the ending time point based on new designation information by changing the schedule within a range in which the desired time point of the job to which the schedule is already assigned is satisfied. If the schedule is adjustable (YES in step S110), the schedule managing unit 203 changes the existing schedule in step S111 and records the schedule that satisfies the desired time point in the new designation information onto the management table in step S106. In step S107, the schedule notifying unit 204 notifies each user of both the new assigned schedule and the changed schedule by using electronic mail.

If the schedule is not adjustable in step S110 described above, the schedule managing unit 203 calculates an alternative plan that allows for the earliest ending time point within a range in which there is availability in the schedule in step S112. Then, in step S113, the schedule notifying unit 204 uses, for example, electronic mail to notify the user of error information, indicating that the desired schedule is not executable, and the alternative plan calculated by the schedule managing unit 203. The process of step S112 in the schedule managing unit 203 corresponds to an example of a process performed by an alternative-plan presenting unit according to an exemplary embodiment of the present invention. The process of step S113 in the schedule notifying unit 204 corresponds to an example of a process performed by a change notifying unit according to an exemplary embodiment of the present invention.

A detailed example of the schedule will be further described below.

Figure 3:
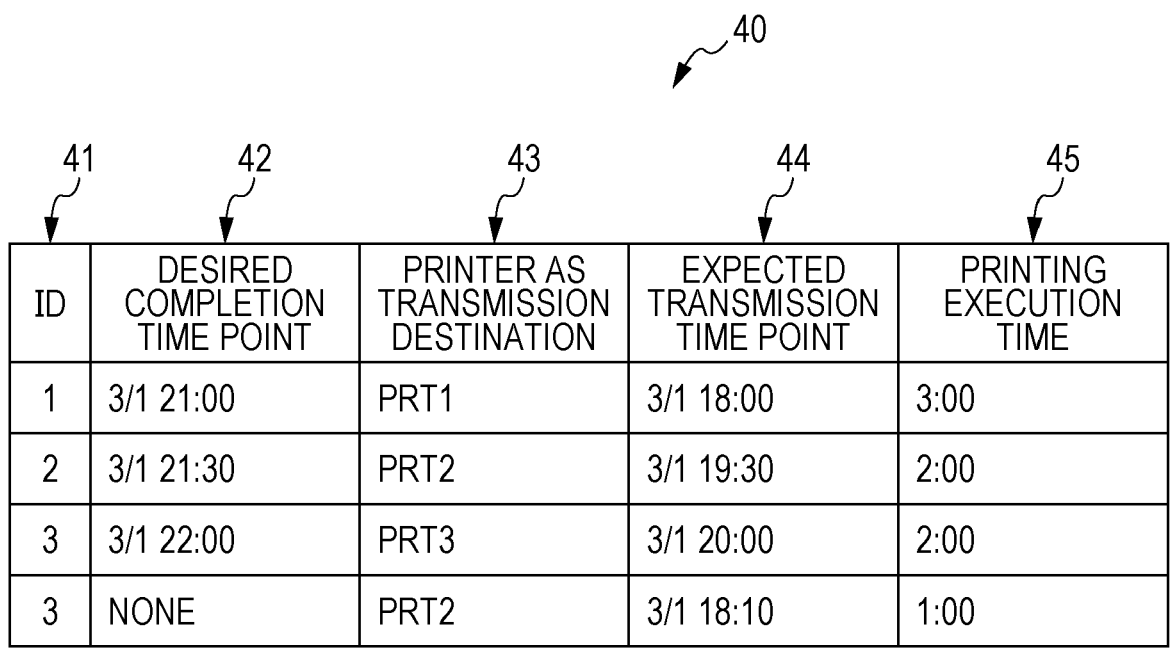
FIG. 3 illustrates an example of a schedule recorded on a management table.

FIG. 3 illustrates an example of a schedule recorded on a management table.

A management table 40 includes an identification (ID) field 41, a desired-completion-time-point field 42, a transmission-destination-printer field 43, an expected-transmission-time-point field 44, and a printing-execution-time field 45.

The ID field 41 has IDs for differentiating jobs from one another. In this exemplary embodiment, serial numbers are used as an example of IDs.

The desired-completion-time-point field 42 has desired completion time points corresponding to time points for ending jobs. In the example shown in FIG. 3, the time and date are also added to each desired completion time point for ensuring temporal uniqueness.

The transmission-destination-printer field 43 has the names of printers serving as output destinations of jobs.

The expected-transmission-time-point field 44 has expected transmission time points corresponding to time points for starting jobs.

The printing-execution-time field 45 has the necessary time (predicted time) it takes to output each job.

In the example shown in FIG. 3, a first job in which the necessary time is three hours and 21:00 of March 1st is designated as the desired completion time point is first assigned to the schedule, and a second job in which the necessary time is two hours and 21:30 of March 1st is designated as the desired completion time point is subsequently assigned to the schedule. Moreover, a third job in which the necessary time is two hours and 22:00 of March 1st is designated as the desired completion time point is assigned to the schedule, and a fourth job in which the necessary time is one hour and that has no designation of the desired completion time point is finally assigned to the schedule.

FIG. 4 is a graph of the schedule shown in FIG. 3.

The abscissa axis in FIG. 4 indicates time, and expected printing time ranges in the three 3D printers 30 included in the printing system 1 shown in FIG. 1 are indicated by arrows.

The first job (Job1) shown in FIG. 3 is assigned such that an image forming process is performed from 18:00 to 21:00 by a first 3D printer (PRT1). The second job (Job2) is assigned to a second 3D printer (PRT2) since the first 3D printer (PRT1) is occupied, such that an image forming process is performed from 19:30 to 21:30. The third job (Job3) is assigned to a third 3D printer (PRT3) since the first 3D printer (PRT1) and the second 3D printer (PRT2) are not available for assignments, such that an image forming process is performed from 20:00 to 22:00. The fourth job (Job4) may be assigned to either one of the second 3D printer (PRT2) and the third 3D printer (PRT3), but is assigned to the second 3D printer (PRT2) since there is a shorter unoccupied time by being assigned to the second 3D printer (PRT2). In the second 3D printer (PRT2), it is assumed that an image forming process according to another job (Job0) not shown in FIG. 3 is being executed and that the image forming process according to the fourth job (Job4) starts upon completion of the job (Job0).

The following description relates to a case where, for example, a fifth job is further transmitted to the management server 20 at 18:00 in the above-described state where the schedule is assigned to the respective jobs.

FIG. 5 illustrates an example of a schedule in a case where a new job is added to the schedule shown in FIG. 4.

In FIG. 5, in the state where the schedule is assigned to the respective jobs as shown in FIG. 4, a fifth job (Job5) in which the necessary time is one hour and 19:00 is designated as the desired completion time point is added to the schedule in a case where the fifth job is transmitted to the management server 20. In this case, since the third 3D printer (PRT3) is available in the schedule, the third 3D printer (PRT3) is assigned to perform an image forming process from 18:00 to 19:00. Similarly, since the third 3D printer (PRT3) is available in the schedule if the desired completion time point in the fifth job (Job5) is 19:30 or 20:00, the third 3D printer (PRT3) is assigned to perform the image forming process.

Next, the following description relates to a case where a job in which the necessary time is two hours is transmitted in place of the fifth job (Job5) described above.

FIG. 6 illustrates another example of a schedule in a case where a new job is added to the schedule shown in FIG. 4.

In FIG. 6, in the state where the schedule is assigned to the respective jobs as shown in FIG. 4, a sixth job (Job6) in which the necessary time is two hours and 20:00 is designated as the desired completion time point is added to the schedule in a case where the sixth job is transmitted to the management server 20. In this case, since the third 3D printer (PRT3) is available in the schedule, the third 3D printer (PRT3) is assigned to perform an image forming process from 18:00 to 20:00.

In contrast to the examples shown in FIGS. 5 and 6, for example, in a case where a job in which the necessary time is three hours and 21:00 is designated as the desired completion time point is transmitted to the management server 20, there is no availability in any of the three 3D printers, and the schedule is not changeable. Therefore, the user is notified of an error indicating that an addition of a job to the schedule that satisfies the desired completion time point for each job is not possible.

If a job that satisfies the desired completion time points of the other jobs and in which the necessary time is three hours is to be added, it would be the quickest to add the job after the first job (Job1) and to perform an image forming process from 21:00 to 24:00 by using the first 3D printer (PRT1). Therefore, 24:00 is suggested as an alternative plan for the desired completion time point. Suggesting the alternative plan saves the user from considering the desired completion time point. Although the earliest time point is desirable as the alternative plan, the alternative plan suggested by the alternative-plan presenting unit according to the exemplary embodiment of the present invention may be a time point other than the earliest time point.

Next, an example where a schedule adjustment is executed will be described.

FIG. 7 is a graph of a schedule different from the schedule shown in FIG. 3.

In the example shown in FIG. 7, a seventh job (Job7) in which the necessary time is three hours and 21:00 is designated as the desired completion time point, an eighth job (Job8) in which the necessary time is one and a half hours and 21:30 is designated as the desired completion time point, a ninth job (Job9) in which the necessary time is two and a half hours and 22:00 is designated as the desired completion time point, and a tenth job (Job10) in which the necessary time is 45 minutes and 19:30 is designated as the desired completion time point are assigned to the schedule in this order. In the example in FIG. 7, it is assumed that an image forming process according to an eleventh job (Job11) is being executed in the second 3D printer (PRT2).

The seventh job (Job7) is assigned such that an image forming process is performed from 18:00 to 21:00 by the first 3D printer (PRT1). The eighth job (Job8) is assigned to the second 3D printer (PRT2) since the first 3D printer (PRT1) is occupied, such that an image forming process is performed from 20:00 to 21:30. The ninth job (Job9) is assigned to the third 3D printer (PRT3) since the first 3D printer (PRT1) and the second 3D printer (PRT2) are not available for assignments, such that an image forming process is performed from 19:30 to 22:00. The tenth job (Job10) may be assigned to either one of the second 3D printer (PRT2) and the third 3D printer (PRT3), but is assigned to the second 3D printer (PRT2) since there is a shorter unoccupied time by being assigned to the second 3D printer (PRT2). An image forming process according to the tenth job starts upon completion of the eleventh job (Job11).

The following description relates to a case where, for example, a twelfth job is further transmitted to the management server 20 at 18:00 in the above-described state where the schedule is assigned to the respective jobs.

FIG. 8 illustrates an example of a schedule in a case where a new job is added to the schedule shown in FIG. 7.

In FIG. 8, in the state where the schedule is assigned to the respective jobs as shown in FIG. 7, a twelfth job (Job12) in which the necessary time is one hour and 20:00 is designated as the desired completion time point is added to the schedule in a case where the twelfth job is transmitted to the management server 20.

In the state shown in FIG. 7, unless the schedule for another job is changed, there is no place for the twelfth job (Job12). However, the tenth job (Job10) is executable by using the third 3D printer (PRT3) while satisfying the designation of the desired completion time point. As shown in FIG. 8, the schedule managing unit 203 of the management server 20 changes the output destination for the tenth job (Job10) to the third 3D printer (PRT3). Then, the twelfth job (Job12) is assigned such that an image forming process is performed from 19:00 to 20:00 by the second 3D printer (PRT2).

Accordingly, the schedule managing unit 203 adjusts the schedule by, for example, changing the output destination. By performing such a schedule adjustment, the schedule is flexibly assigned, thereby achieving an improved operating rate of the 3D printers.

With regard to the tenth job (Job10) whose schedule has been changed as a result of the schedule adjustment, the changed schedule is notified to the user by the schedule notifying unit 204. With this notification, the change of the schedule is recognized by the user, whereby the output material is collected at the proper output destination at the proper completion time point.

Next, another example where a schedule adjustment is executed will be described.

FIG. 9 is a graph of another schedule different from the schedules shown in FIGS. 3 and 7.

In the example shown in FIG. 9, a thirteenth job (Job13) in which the necessary time is three hours and 21:00 is designated as the desired completion time point, a fourteenth job (Job14) in which the necessary time is two hours and 21:30 is designated as the desired completion time point, a fifteenth job (Job15) in which the necessary time is two hours and there is no designation of the desired completion time point, and a sixteenth job (Job16) in which the necessary time is one hour and 19:00 is designated as the desired completion time point are assigned to the schedule in this order. In the example in FIG. 9, it is assumed that an image forming process according to a seventeenth job (Job17) is being executed in the third 3D printer (PRT3).

The thirteenth job (Job13) is assigned such that an image forming process is performed from 18:00 to 21:00 by the first 3D printer (PRT1). The fourteenth job (Job14) is assigned to the second 3D printer (PRT2) since the first 3D printer (PRT1) is occupied, such that an image forming process is performed from 19:30 to 21:30. The fifteenth job (Job15) is assigned to the third 3D printer (PRT3) since the first 3D printer (PRT1) and the second 3D printer (PRT2) are not available for assignments, such that an image forming process is performed for two hours upon completion of the seventeenth job (Job17). The sixteenth job (Job16) is assigned to the second 3D printer (PRT2) since there is an available time in the second 3D printer (PRT2).

The following description relates to a case where, for example, an eighteenth job is further transmitted to the management server 20 at 18:00 in the above-described state where the schedule is assigned to the respective jobs.

Figure 10:
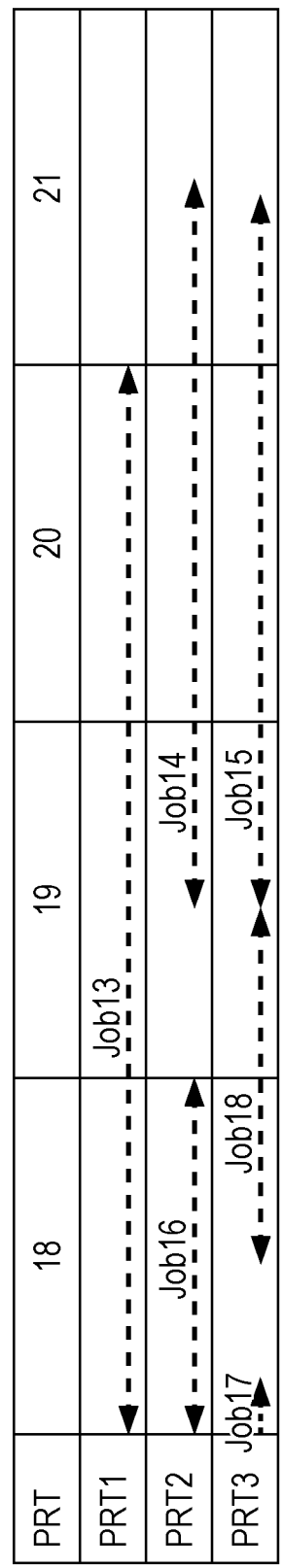
FIG. 10 illustrates an example of a schedule in a case where a new job is added to the schedule shown in FIG. 9.

FIG. 10 illustrates an example of a schedule in a case where a new job is added to the schedule shown in FIG. 9.

In FIG. 10, in the state where the schedule is assigned to the respective jobs as shown in FIG. 9, an eighteenth job (Job18) in which the necessary time is one hour and 19:30 is designated as the desired completion time point is added to the schedule in a case where the eighteenth job is transmitted to the management server 20.

In the state shown in FIG. 9, unless the schedule for another job is changed, there is no place for the eighteenth job (Job18). However, since the fifteenth job (Job15) has no designation of the desired completion time point and the image forming process has not started yet at 18:00, the schedule managing unit 203 of the management server 20 changes the completion time point of the fifteenth job (Job15) to 21:30, as shown in FIG. 10. Then, the eighteenth job (Job18) is assigned such that an image forming process is performed from 18:30 to 19:30 by the third 3D printer (PRT3).

Accordingly, the schedule managing unit 203 adjusts the schedule by, for example, changing the output destination. By performing such a schedule adjustment, the schedule is flexibly assigned, thereby achieving an improved operating rate of the 3D printers.

With regard to the fifteenth job (Job15) whose completion time point has been changed as a result of the schedule adjustment, the changed schedule is notified to the user by the schedule notifying unit 204. With this notification, the change of the schedule is recognized by the user, whereby the output material is collected at the proper output destination at the proper completion time point.

Due to being a load on the user, an unlimited change of the schedule is not desirable. In this exemplary embodiment, the number of times the schedule may be changed and the time period for changing the schedule are limited. Conceivable examples include prohibiting the change of the schedule multiple times, prohibiting the change of the schedule three or more times, and prohibiting the change of the schedule for two or more hours. With such limitations, the load on the user caused by the change of the schedule may be reduced.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A management apparatus comprising:
a processor configured to:
acquire image data expressing at least one of a three-dimensional image and an image;
acquire desired time information associated with the image data, the desired time information indicating a desired time for completing an image forming process for forming the image, the desired time being expressed as at least one of a time point and a time frame;
assign image formation of the image data to an image forming apparatus that performs the image forming process such that the image forming process is completed at the desired time indicated by the desired time information; and
output the image data toward the assigned image forming apparatus,
wherein when the processor assigns image formation of an image expressed by first image data, the processor allows an assignment change with respect to second image data, image formation for which is already assigned, within a range that satisfies the desired time, and
wherein a number of times of the assignment change is limited to one or more finite number of times or a time period for the assignment change is prohibited after a predetermine time passes after the assignment change is completed.

2. The management apparatus according to claim 1, wherein the image data expresses the three-dimensional image.

3. The management apparatus according to claim 1, wherein the processor is further configured to provide notification of an assignment result by the assigning.

4. The management apparatus according to claim 1, wherein the processor is further configured to notify a result of the assignment change.

5. The management apparatus according to claim 1, wherein the processor is further configured to, if the image formation is not assignable within a range that satisfies the desired time, present a completion time point at which the image formation is assignable as an alternative plan for the desired time.

6. The management apparatus according to claim 5, wherein the presenting further includes presenting an earliest completion time point of the completion time point at which assignment is possible as the alternative plan.

7. A non-transitory computer readable medium storing a management program loaded in an information processing apparatus and causing the information processing apparatus to operate as a management apparatus that executes a process, the process comprising:
acquiring image data expressing at least one of a three-dimensional image and an image;
acquiring desired time information associated with the image data, the desired time information indicating a desired time for completing an image forming process for forming the image, the desired time being expressed as at least one of a time point and a time frame;
assigning image formation of the image data to an image forming apparatus that performs the image forming process such that the image forming process is completed at the desired time indicated by the desired time information; and
outputting the image data toward the assigned image forming apparatus,
wherein when assigning image formation of an image expressed by first image data, the process includes allowing an assignment change with respect to second image data, image formation for which is already assigned, within a range that satisfies the desired time, and
wherein a number of times of the assignment change is limited to one or more finite number of times or a time period for the assignment change is prohibited after a predetermine time passes after the assignment change is completed.

* * * * *